Figure 1:
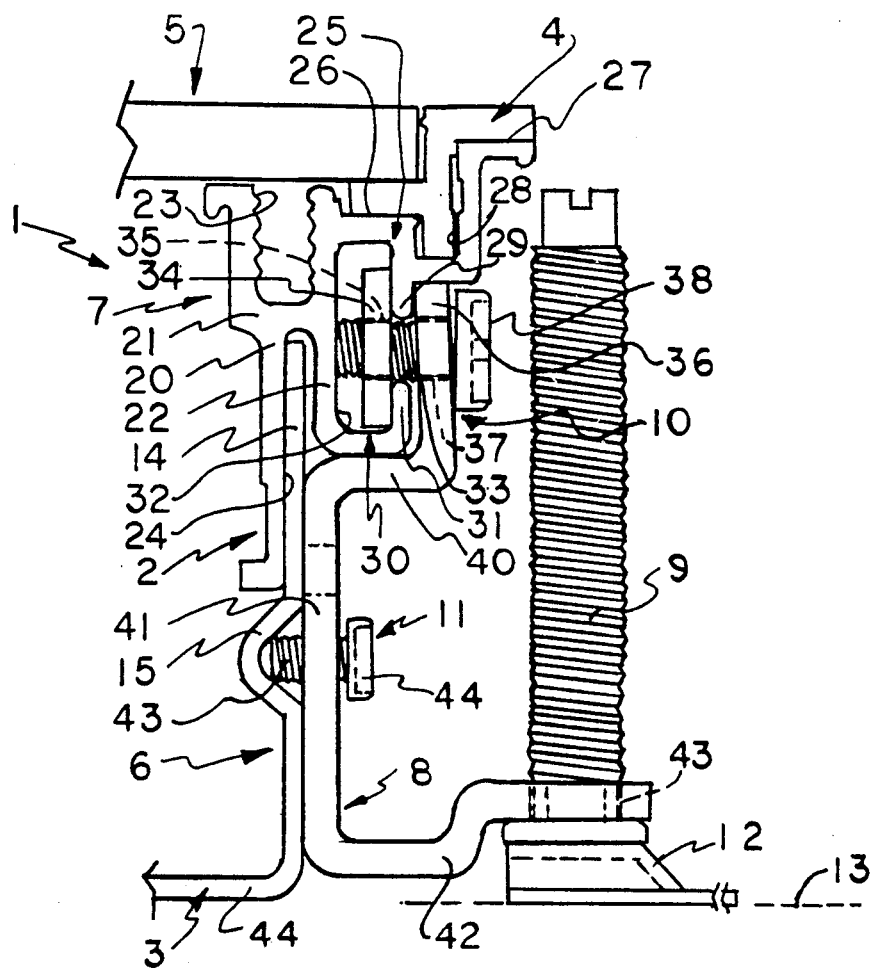

United States Patent [19]

Penczak

[11] Patent Number: 5,003,737
[45] Date of Patent: Apr. 2, 1991

[54] SIDE RAIL FOR TRENCHDUCT

[75] Inventor: John P. Penczak, Parkersburg, W. Va.

[73] Assignee: Butler Manufacturing Company, Kansas City, Mo.

[21] Appl. No.: 420,950

[22] Filed: Oct. 13, 1989

[51] Int. Cl.$^5$ .............................................. E04B 5/48
[52] U.S. Cl. .................................. 52/126.2; 52/221; 138/111; 174/49
[58] Field of Search ...................... 52/220, 221, 126.2; 220/3.4; 138/92, 111, 116, 117, 173; 174/48, 49, 96

[56] References Cited

U.S. PATENT DOCUMENTS

| | | |
|---|---|---|
| 3,435,568 | 4/1969 | Hoseason et al. ............ 52/126.2 X |
| 3,593,472 | 7/1971 | Bargar ........................... 52/126.2 X |
| 4,517,777 | 5/1985 | Calhoun ........................ 138/111 X |
| 4,612,746 | 9/1986 | Higgins ........................ 52/126.2 X |
| 4,637,185 | 1/1987 | Bowman ........................ 220/3.4 X |

Primary Examiner—David A. Scherbel
Assistant Examiner—Creighton Smith
Attorney, Agent, or Firm—Frederick J. Olsson

[57] ABSTRACT

Side rail structure for trenchduct side rail has a lower section and an upper section. The lower section is thin, galvanized sheet steel and the upper section is an aluminum extrusion clamps connect the upper and lower sections so that in a full bottom trench the whole trench can be adjusted. In both full bottom and bottomless trench, the upper section can be adjusted with respect to lower section. In the full bottomless trench a friction fit holds upper and lower sections together.

14 Claims, 1 Drawing Sheet

SIDE RAIL FOR TRENCHDUCT

This invention relates to underfloor or in-floor electrical distribution systems and particulary relates to improvements in side rail structure for trenchducts to be embedded in concrete floor wherein the subfloor is either metal or concrete or is the form for a concrete monolithic floor.

One of the objects of the invention is to provide side rail structure which can be employed both in full bottom and bottomless trenchduct with consequent cost savings due to the reduction in number of parts to be inventoried.

Another object of the invention is to provide side rail structure in a full bottom trenchduct for concrete which permits the whole trench to be adjusted vertically with respect to the subfloor and for the upper section (carrying the covers and trim) to be independently, vertically adjusted whereby to effect cost reduction especially for thicker floors by permitting the depth of the trench to be commensurate with desired capacity rather than with the depth of the floor.

Another object of the invention is to provide a side rail having a formed steel lower section and an aluminum extrusion upper section which are coupled together via carriers and clamp means functioning making a unified rigid structure permitting thin steel and aluminum sections used for narrow body trenchduct to be used and be equally effective on wide body trenchduct which results in cost reduction because of the reduction in material and in inventory.

A further object of the invention is to provide for a bottomless trench a side rail structure wherein the upper and lower sections are held together by friction forces which maintains the sections together when the rail is shipped to the job, when the rail is field assembled with covers and trim, and when narrow body bottomless trenchduct is factory assembled. This linear arrangement eliminates pins or screws and holes and alignment of same and thereby reducing fabricating and installation costs.

Another object of the invention is to provide, in a trenchduct wherein the upper section of a side rail is vertically adjustable via a carrier moved by an adjusting screw, a two jaw clamp arrangement to secure the upper section and carrier together, the arrangement having the advantage of both rigidly locking the upper section without distortion and providing load transfer means between the upper section and the carrier.

Figure 2:
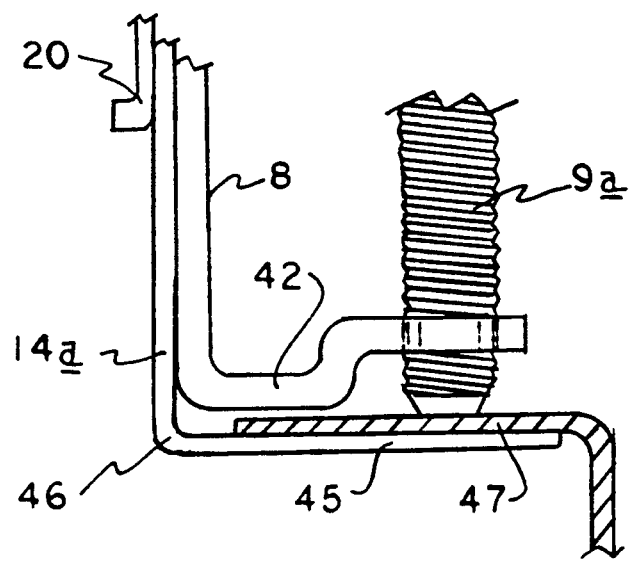

The invention will be described below in connection with the following drawings wherein:

FIG. 1 is an end view of one side of a full bottom trench assembly incorporating the invention; and FIG. 2 is a fragmentary view illustrating how the assembly of FIG. 1 is modified for a bottomless trench; and It will be understood that the terms of art "trenchduct" and "trench" used herein are synonymous.

Trenchduct is conventionally constructed in three forms; i.e. full bottom, intermittent bottom, and bottomless. In all types, the trench assembly includes a pair of side rails and covers and tile and/or carpet trim supported by the rails. It is conventional, that a side rail comprise upper and lower sections with the upper section being vertically adjustable with respect to the lower section. The trim and side rails are elongated depending upon the desired length of the trench unit. In any event, the invention is applicable to all trench employing side rails and trim. Thus, the drawings herein disclose the invention by way of fragmentary end views.

The tile/carpet trim noted herein is described in detail in may copending application Ser. No. 569,965 entitled TILE/CARPET TRIM FOR TRENCHDUCT filed 8/20/90 and the disclosure is incorporated herein by reference said application being a continuation of application Ser. No. 420,885, filed 10/31/88, now abandoned.

In connection with this application, patents of interest are; Halkovich U.S. Pat. No. 3,550,336; Fork U.S. Pat. No. 3,851,674; Bargar U.S. Pat. No. 3,593,472; and Higgins U.S. Pat. No. 4,612,746.

In FIG. 1 a full bottom trench 1 includes the side rail assembly 2, the bottom 3, the tile/cover trim 4 and the cover 5. As will be understood, the other side rail in the trench is a mirror image of the side rail of FIG. 1. The trench is adapted to mounted horizontally over a subfloor and be buried in concrete with the removable covers flush with the floor surface.

The side rail assembly comprises a lower section in the form of a riser 6, an upper section 7 (mounting tile/carpet trim 4 and cover 5) a carrier 8 including the adjusting screw 9, and upper first clamp means 10 and a lower second clamp means 11. The adjusting screw 9 extends through a clearance hole in carrier 8 and is rotatable mounted in foot 12 fixed to subfloor 13.

The upper clamp means 10 secures the upper section to the carrier 8 and the lower clamp mean 11 secures the lower section 6 to the carrier.

With the above condition of the clamp means 10 and 11, rotation of the screw 9 will cause the whole trench to move vertically with respect to the sub-floor 13. If the lower clamping effect of clamp means 11 is relieved, the structure provides that rotation of the adjusting screw will cause the upper section 7 (together with trim 4 and cover 5) to move vertically with respect to the lower section 6 or subfloor 13. As will be apparent both adjustments are made by the same adjusting screw.

The double adjustment feature is highly advantageous. In some buildings floors the thickness of the concrete far extends the depth of the trench which is necessary to attain the desired cable capacity. The ability to raise the whole trench (so concrete can flow underneath) obviates the necessity making the trench thickness commensurate with the floor thickness.

In the embodiment shown, the lower section 6 and the bottom are integrated and are 10 feet in length with a thickness of 2 ½ inches. The height of the riser may vary between 1 and 10 inches depending upon the depth of the trenchduct. The thickness of the riser 14 and bottom 3 varies between 0.044 and 0.060 inches. The lower section 6 essentially comprises the riser 14 and is formed with a bead 15 which is coextensive with the riser.

The lower section 6 and bottom 3 are desirable formed of galvanized steel which is brake formed. The upper section 7 is an aluminum extrusion of relatively intricate configuration or will now be explained.

A vertically extending inside wall 20 is joined at 21 to an outside wall 22 to form an upper channel 23 and a lower channel 24. The upper channel 23 is for receiving cover holdown screws not shown. The lower channel 24 receives the section 14 of riser or lower section 6. Connected to the outside wall 22 is an upper extension 25 which forms a lower trim support 26, an upper trim support 27, a trim cavity 28 therebetween together with a flange 29 spaced from the outside wall 22. Also connected to the inside wall 22 is lower extension 30 which forms a flange 31 in vertical alignment with flange 29.

The above structure forms a clamp channel 32. The respective ends of the flanges 29 and 31 are spaced apart to form an access slot 33 which provides access to clamp channel 32.

The total height of the aluminum extrusion is approximately 1 ⅛ inches. The various parts of the extrusion desired above are substantially the same thickness which is approximately 1 ⅛ inches. The significance of the small wall thickness will be commented on later.

The carpet trim 4 is in the carpet position being disposed on the upper trim support 27, on lower trim support 26 and in the trim cavity 28. For more detail on the trim mounting, see my coopending application Ser. No. 569,965.

The upper clamp means 10 fixedly but releasably connects the upper section 7 and the carrier 8. The clamp is designed such that flanges 29 and 31 (hence upper section 7) are captured between two jaws which not only lock the upper section between the same but enhance the transfer of load between the upper section and the carrier.

A jaw or slider 34 of about 2 inches in length is disposed in the clamp channel 32 and extends across the access slot 33. The jaw has a pair of threaded holes one of which noted at 35. The holes are open to the access slot 33.

The top portion 36 of the carrier extends across the access slot 33 and is in juxta position with the flanges 29 and 31. The top portion 36 has a clearance aperture 37 which is in alignment with the access slot 33. A screw 38 has its head bearing on the top portion 36 and its threaded shank extending through the clearance aperture 37, the access slot 33, and is threaded into the hole 35 in jaw 34. In FIG. 1, the screw 38 has been turned to a position just prior to being turned to move to a position effecting full clamping force. It will be apparent that top section 36, when the screw is tightened up, functions as a jaw of a clamp.

The carrier 8 is contoured at 40 to extend under the lower extension 30 of the carrier and provides vertical support.

Further, the carrier 8 extends down as indicated at 41 and abuts and engages the riser 14. On the lower end, the carrier extends outwardly in a foot section 42 having a threaded hole carrying the adjusting screw 9.

The lower clamp means 11 is spaced downwardly from the upper clamp 11. The function of the lower clamp means to secure the lower section and the carrier together in the sense of preventing vertical separation of these components.

The lower clamp includes the bead 15 in riser 14 and a screw 43 threaded into the carrier.

The above described components comprising the riser 14, upper section 7, carrier 8, and clamp means 10 and 11 provide a structure which permits the same minimum metal thickness to be employed in both narrow and wide body trench. The results in savings in metal material and in inventory. The foregoing is attained by unifying the thin upper 7 and thin lower section 6 so that the composite has the necessary rigidity.

Rigidity is a necessary ingredient for factory assembly, transportation and during installation. After assembly at the factory the 10 foot lengths of trench a picked up by a magnetic lift which grips a cover at the center of the trench. The weight of the covers has the effect of providing a bending or flexure force and the side rails must resist this force. The trench are attached in bundles, shipped to the job site and then lifted in the same way as noted above.

The manner of attaining rigidity factor in the side rails will now be explained.

With reference to FIG. 1, it will be observed that the top section 36 is slightly bent inwardly and engages the flange 29. Also, it will be observed that the section 41 of the carrier is engaging the riser 14 and the riser in turn is engaging the inside wall 20.

When the screw 38 is turned in against the top 36 abutting the flange 30, the top 36 begins to straighten up or rotate clock wide until same engages the flange 31. During this process, the jaw 34 is being drawn up against the flanges 29 and 31. The movement of the top 36 causes the parts 40 and 41 of the carrier to move inwardly. The part 41 becomes a thrust-creating means and pushes the riser 14 against the inside wall 20. The riser is clamped between the part 41 and wall 20.

The aluminum extrusion upper section 7 is now rigidly connected to the lower section. The lower section has a right angle bead 44, the rigidly effect of what is now made available to minimize flexure of the aluminum extrusion. The 45° bends on the bead 15 assist in minimizing flexure and morecover the bead has the additional affect of holding the riser against lateral flexure. The bead may take other forms such as a 45° bend.

Before proceeding, it is pointed out that in the upper clamp means 10 the length of the screw 38 must be such that it does not bottom out on the inside wall 22.

Referring now to the lower clamp means when the screw 43 is turned in the end of the screw enters the bead 14. The screw is turned until head is firm against the carrier. At this point the end of the screw will be within the bead 15. The length of the screw must be such that the end of the screw merely touches the bead. The screw should not exert a force to push the bottom of the riser away from the carrier. It is preferable for the end of the screw 44 to contact both the upper lower walls of the bead 14.

As to number of carriers used, a 10 foot length of trench each rail should have a carrier at each end and two carriers spaced intermediate the ends. As explained later, a carrier on the end of a rail has the additional function of coupling abutting trench.

The foregoing description has been in connection with full bottom trench. The same side rail structure with minimum modification adapts the rail for use in bottomless trench. This will now be explained in connection with FIG. 2.

For bottomless application, the lower clamp eliminated from the riser as noted at 14a and the bottom 3 has been replaced by an outwardly extending foot 45. A right angle bend 46 remains between the riser and foot.

The foot 42 of the carrier 8 and the foot 45 are sufficiently spaced apart to accommodate the void closure 47. The lower end of the adjusting screw 9a is adapted to engage the void closure.

The foot 45 and void closure 45 are adapted to be welded to the deck subfloor. The adjusting screw 9a adjusts the upper section with respect to the deck.

In side rails for bottomless trench, the force developed by the thrust creating means 41 of the carrier plays an important part. This force develops a friction forces between the riser, the carrier and the riser wall 20. The friction force is sufficient to hold the upper and lower sections of the side rail firmly together for the conditions in which the rails are employed.

It is conventional to factory assemble left at right hand rails and ship to the job site with the covers being independently shipped. For factory and job site handling purposes, the friction fit keeps the upper and lower sections together. This is economical because the operations to form the lower clamp means and the labor cost for installing the screw are eliminated. Further it is not necessary on the job to backoff a screw in order to make adjustment of the upper section of the rail.

Another feature arising out of the above described structure is that upon installation abutting trench may be firmly connected by the carriers which have previously served their anti-flex purpose.

As previously mentioned, the top 36 of the carrier 8 and the jaws 38 have a pair of screws. For securing abutting trench the carrier on one of the trench is moved so that it and the jaw extend across the juncture. When the screws are tightened up the upper clamp secures abutting trench together.

I claim:

1. A side rail for a trench duct to be supported in a horizontal position over a subfloor
    a lower section;
    an upper section;
    a carrier;
    first clamp means, operable for clamping said carrier and said upper section together and further operable for releasing the same;
    second clamp means operable for clamping said carrier and said lower section together and further operable for releasing same;
    an adjusting screw connected with said carrier to interengage said subfloor when said trenchduct is in said horizontal position.
    said lower section, said upper section, said carrier and said first and second clamps means functioning as follows:
    when said first and second clamp means have clamped said upper and lower sections to the carrier, for rotation of said adjusting screw to vertically move said upper and lower sections in unison; and
    when said first clamp means has clamped said carrier and upper section together and said second clamp means has released said carrier and lower section, for rotation of said adjusting screw to vertically move the upper section with respect to the lower section.

2. The side rail assembly of claim 1 further including support means on said carrier engaging the underside of said upper section to provide vertical support therefor.

3. The side rail assembly of claim 1 wherein said lower section includes a thin, flat riser and said upper section has a depending arm engaging a side of the riser.

4. A side rail assembly rail assembly for a trenchduct to be supported in a horizontal position on a subfloor:
    a lower section including a riser to extend vertically when the trenchduct is in said horizontal position;
    an upper section including a wall closely adjacent said riser when the trenchduct is in said horizontal position;
    a carrier;
    thrust means on said carrier engaging said riser;
    first clamp means operable, in cooperation with said carrier, to clamp said carrier and upper section together and to cause said carrier thrust means to move said riser against said wall and further operable to unclamp said carrier and upper section and provide for the thrust means to move away from said wall;
    second clamp means operable for clamping said riser and said carrier together and operable for releasing the same; an adjusting screw threaded in said carrier to interengage said subfloor when said trenchduct is in said horizontal position; and
    said clamp means functioning as follows;
    when said first clamp means has clamped said carrier and upper section together and caused said thrust means to push said riser against said wall, and said second clamp means has clamped said riser and said carrier together, for rotation of said adjusting screw to vertically move the upper and lower sections in unison; and
    when first clamp has clamped said carrier and said upper together and the second clamp means has unclamped the carrier and riser, for rotation of the adjusting screw to move the upper section vertically with respect to the riser.

5. The side rail assembly of claim 4 when said second clamp means includes:
    a bead on said riser and spaced downwardly from said thrust means;
    threaded hole in said carrier adjacent said bead; and
    screw means threaded in last said threaded hole for extending out and engaging said bead to prevent said riser and carrier from moving relative to one another in a vertical direction, the engagment of the screw and bead being without causing separation of the riser and carrier 6. The side rail assembly of claim 4 wherein:
    said upper section is formed with a clamp channel having an access shot coextensive therewith; and
    said first clamp means includes a jaw slideable mounted in said clamp channel and extending across said access slot and having a threaded hole open to the access slot, the jaw bearing on a inner wall of the channel, a top portion of said carrier extending across said access slot and bearing on said upper section and having a clearance aperture and a screw the head of which bears on said top portion and the shank of which extends through the clearance aperture and is threaded into said threaded hole in the jaw, the screw when turned in one direction clamping the upper section between the jaw and the top portion of the carrier and also when turned in the one direction causing said thrust means to develop force to move said riser against said wall and when turned in the opposite direction relieving the clamped condition and causing a reduction of said force developed by the thrust means.

7. In a pair of abutting trenchduct, a pair of abutting side rails each abutting side rail comprising:
    an elongated, upright lower section, the respective ends of the lower sections abutting one another along an axis;
    an elongated upper section mounted on the lower section, the respective ends of the upper sections abutting one another along said axis;
    a clamp channel having an access slot formed in the upper section, the clamp channel and access slot being coextensive with the upper section and the respective clamp channels and access slots being axially aligned with on another;

first jaw means disposed in the clamp channel of one upper section and also in the clamp channel of the other upper section so as to extend across the juncture between abutting edges of the upper sections;

second jaw means extending across the juncture between abutting edges of the upper sections and engaging the upper sections; and screw means extending through said access slots and engaging the first and second jaw means and forcing the first and second jaw means against the upper sections.

8. In a pair of abutting trenchduct, a pair of abutting side rails, each abutting side rail comprising:

an elongated, upright lower section, the respective ends of the lower sections abutting one another along an axis;

an elongated upper section mounted on its lower section, the respective ends of the upper sections abutting one another along said axis;

a clamp channel having an access slot formed in the upper section, the clamp channel and the access slot being coextensive with the upper section and the respective clamp channels and access slots being axially aligned with one another;

jaw means disposed in the clamp channel of one upper section and also in the clamp channel of the other upper section so as to extend juncture between the abutting edges of the upper sections, the jaw means being accessible through said access slots of the upper sections;

a carrier extending across the abutting edges of said upper sections and engaging the respective upper sections and at least partially covering the respective access slots in upper sections;

screw means respectively disposed on opposite sides of the juncture between abutting edges of the upper sections and connected between said jaw means and said carrier and forcing the jaw means and the carrier against said upper sections.

9. In a trenchduct to extend horizontally, a side rail assembly including an elongated, lower section and an elongated, upper section, the upper section comprising:

an inside vertically extending wall;

an outside vertically extending wall spaced from the inner wall whereby to form an upper channel and a lower channel, the lower channel receiving said lower section whereby the upper section is moveably mounted on the lower section for vertical adjustment thereon and the upper channel being for use in receiving cover holddown screws;

an upper extension and a lower extension connected to said outside wall and extending outwardly therefrom;

said upper and lower extensions forming a clamp channel with an access slot, the clamp channel and the access slot being coextensive with the upper section;

said upper section forming an upper trim support, a lower trim support, and a trim cavity therebetween;

a carrier engaging said lower and upper extensions and extending across said access slot and having at least one clearance hole open to the access slot;

a jaw movably mounted in said clamp channel and having a threaded opening and accessible through said access slot; and at least one screw, the head of which engages the portion of said carrier extending across said access slot and the threaded shank of which extends through said clearance aperture and through said access slot and is threaded into said jaw.

10. In a trenchduct to extend horizontally, a side rail assembly having a lower section and an upper section mounted thereon, the upper section comprising:

an inside vertically extending wall;

an outside vertically extending wall spaced from the inner wall whereby to from an upper channel and a lower channel, the lower channel receiving said lower section and the upper channel being for use in receiving cover holddown screws; and means connected to said outside wall and extending outwardly therefrom and forming a lower trim support and an upper trim support spaced upwardly and outwardly of the lower trim support and a trim cavity there between.

11. A side rail assembly for a bottomless trenchduct to be oriented horizontally over a metal subfloor:

a lower section having riser, the riser to extend vertically when the trenchduct is in a horizontal position on the metal subfloor;

an upper section including a wall closely adjacent said riser when the trenchduct in said horizontal position;

a carrier;

thrust means on said carrier engaging said riser; and clamp means operable for clamping said carrier and said upper section together and for causing said thrust means to develop force to cause said riser to tightly engage said wall and developing a friction force sufficient to hold said upper and lower sections together.

12. The side rail assembly of claim 11 further including an adjusting screw connected to said carrier to interengage with said metal subfloor when said trenchduct is in said horizontal position.

13. The side rail assembly of claim 11 wherein said lower section has a foot connected to said riser, the foot to interengage with said metal subfloor when the trenchduct is in said horizontal position.

14. The side rail assembly of claim 13 further including a void closure mounted on said foot and wherein said adjusting screw directly engages the void closure.

* * * * *